March 30, 1965  H. M. WILLIAMSON  3,175,314
RETAINING PIN FOR TELESCOPED PARTS COMPRISING SEPARATE
LONGITUDINALLY BOWED SEQUENTIALLY
INSERTABLE RESILIENT MEMBERS
Filed Aug. 3, 1959
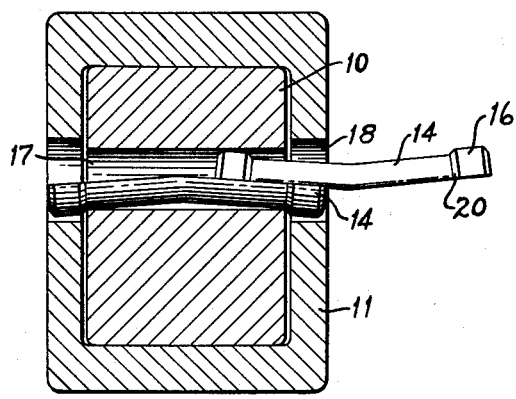
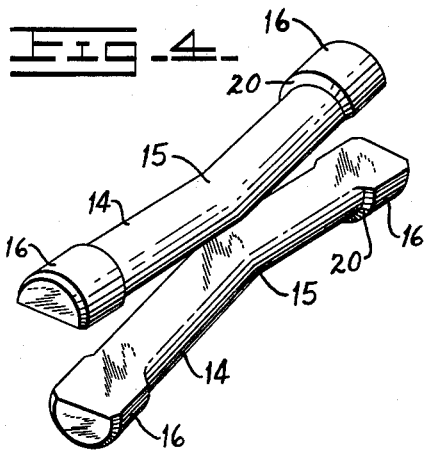
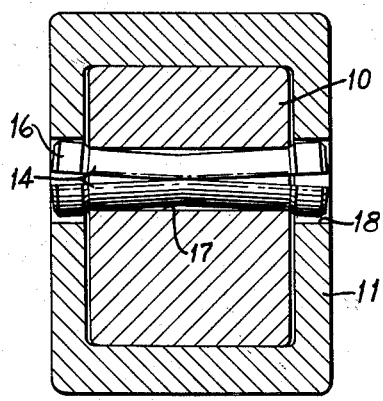
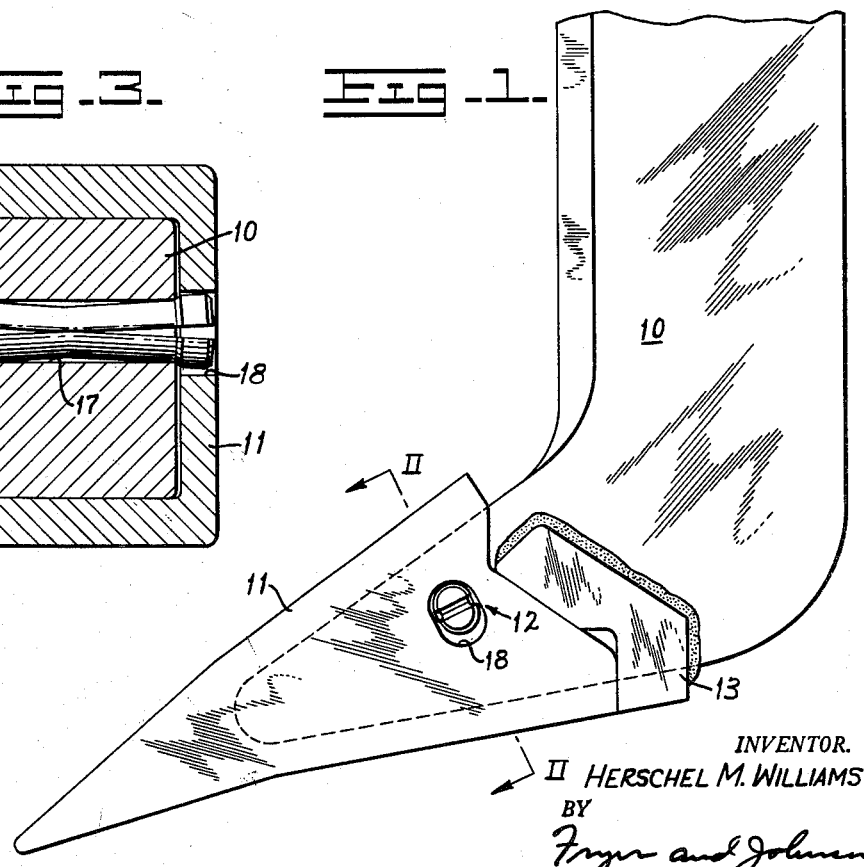
INVENTOR.
HERSCHEL M. WILLIAMSON
BY
Fryer and Johnson
ATTORNEYS 3,175,314
RETAINING PIN FOR TELESCOPED PARTS COMPRISING SEPARATE LONGITUDINALLY BOWED SEQUENTIALLY INSERTABLE RESILIENT MEMBERS
Herschel M. Williamson, Joliet, Ill., assignor to Caterpillar Tractor Co., Peoria, Ill., a corporation of California
Filed Aug. 3, 1959, Ser. No. 831,401
3 Claims. (Cl. 37—142)

This invention relates to retaining or coupling pins such as are used for holding telescoped parts in assembled relationship.

One use for which the retainer of the present invention is particularly adapted is for securing a hardened point or tip on the shank of an earth working tool and the invention will be described herein in connection with such use. However, it is not limited to this specific use and its application in other fields where telescoped or nested parts are secured together will be apparent upon an understanding of the following description.

An example of a tool employing a tip such as that mentioned is a ripper which includes one or more shanks inclined and pointed at one end to be drawn through the earth or rock formations by a tractor for breaking the formation as a step in agricultural, mining or building operations. The pointed end of the shank is telescopically fitted into a hardened tip and secured thereto most often by a pin or fastening device which extends transversely through registering holes in the shank and the walls of the tip. Since the greatest stress to which a ripper is submitted is usually during forward motion which tends to push the tip onto the shank, the pin is not necessarily designed to withstand shearing forces of very great magnitude but must be sufficiently strong to retain the tip in place when the shank is drawn rearwardly through the broken material. The loss of a tip when the ripper is loosening material for later processing in rock crushers or the like sometimes proves very costly because of damage caused by the hardened tip in the crusher. For this and other reasons the tip must be securely held in place but because of the necessity for replacing worn tips, the retaining or securing means must also be capable of ready removal and replacement.

It is the object of the present invention to provide retaining means for holding telescoped parts in assembly which is unusually durable and secure and which is easily inserted and removed and capable of re-use and also capable of insertion and removal without the necessity of special tools.

Further and more specific objects and advantages of the invention are made apparent in the following specification wherein the invention is described in detail by reference to the accompanying drawing.

In the drawing:

FIG. 1 is a view in side elevation of the lower portion of a ripper shank with a ripper tip secured in place thereon in accordance with the present invention;

FIG. 2 is a sectional view taken on the line II—II of FIG. 1 but showing the retaining means only partially installed;

FIG. 3 is a section similar to FIG. 2 with the retaining means in place; and

FIG. 4 is a perspective view of the retaining pin of the present invention which is formed in two separable parts.

Referring first to FIG. 1, a conventional ripper shank is illustrated at 10 as having a hardened ripper tip 11 telescopically fitted over its forwardly directed end and secured in place thereon by retaining means generally indicated at 12 which extends through registering holes in the side walls of the tip and the shank. Abutment means such as a shoulder piece 13 is usually employed to react the thrust forces as the tip is advanced through the earth and also to prevent jamming of the tip on the end of the shank as a result of such forces. The purpose of the retainer assembly 12 is to prevent the tip from falling from the end of the shank and particularly to prevent the tip from being forceably pulled from the end of the shank by engagement with the earth or rock in which it is working when it is necessary to move the shank rearwardly.

The retaining means of the present invention provides a two-piece pin such as shown in FIG. 4 in which each piece is formed as a semi-cylindrical part 14. One, or preferably both parts, are bent slightly at a mid point as shown at 15 and both are provided with an enlarged semi-cylindrical head 16 at each end. As shown in FIGS. 2 and 3, the shank 10 is provided with a cylindrical bore 17 extending transversely therethrough and the side walls of the hardened tip 11 are provided with elongated openings 18 which register with the bore 17 in assembly and the configuration of which is best shown in FIG. 1.

When the parts 14 of the pin are placed together with their flat sides opposed, the central bend 15 prevents abutment throughout the full length of the flat sides so that the parts occupy a spread relationship and present an assembly that is considerably larger than the bore 17 in the shank. One of the parts 14 may, however, be easily inserted through the bore to the position occupied by the lower part shown in FIG. 2 and the other part partially inserted as in the upper position in FIG. 2. A hammer blow on the end of the upper part then forces it home to the position illustrated in FIG. 3 by virtue of the resiliency of the metal of which the parts are made permitting a momentary straightening of the bend in one or both parts. When thus installed, the resiliency of the parts prevents their accidental removal.

Removal of the parts is accomplished by first driving one part out as by applying a punch, drift pin, or other small ended tool to one of its ends and striking it with a hammer. A slight chamfer between the head 16 and the body 14, as shown at 20, facilitates removal of the first part of the pin in this manner and is preferred though it is not necessary.

The elongated opening 18 within which the heads of the pin parts are received is arranged with its longest direction in a plane normal to the direction of the forces which tend to remove the pin from the shank and it is sufficiently narrow in the opposite direction to prevent rotation of the assembled pin parts so that it insures positioning of the pin parts with their widest dimensions resisting forces which tend to remove the tip. This is an advantage because it gives added resistance to shearing of the pin parts and also because it prevents straightening of the resilient parts which would tend to bring them into positions enabling them to slip accidentally out of the bore 17.

The degree of resiliency of the pin parts 14 is not highly critical and they will function satisfactorily without a strong spring action in their assembled position. In fact when the are assembled a relatively free metal-to-metal fit at their contacting points serves the purpose of the invention though a slightly greater bend in the parts which would result in their distortion several thousandths of an inch from their normal shape is also acceptable so that manufacturing tolerances are not critical. The pin parts are preferably made of a medium carbon type alloy steel which produces a good spring and high shear strength after heat treatment.

I claim:

1. Retaining means for holding a hollow part in telescoped assembly over a solid part which comprises said solid part having a bore extending through it, said hollow part having openings in opposite sides registering with and larger than said bore, and a pin to extend through said openings and bore formed of two substantially identical longitudinally separable halves having bends between their ends to effect resilient separation of the ends when the pin halves are inserted, said pin halves having enlargements at both ends projecting into said openings in assembly and said openings being shaped to prevent rotation of the pin after assembly.

2. Retaining means for holding a hollow part in assembly embracing another part wherein the other part has a through hole and the hollow part has two holes one registering with each end of the through hole in assembly which comprises a pair of substantially identical pin-like elements of resilient material having central bends engageable with each other to urge the ends of the elements apart, each of said elements having an enlargement at each end, and said holes in the hollow part being of sufficient size to receive said enlargements in assembly and being of irregular contour to prevent rotation of the assembled pin-like elements.

3. In combination with a supporting shank having a transverse bore and a hollow excavating tooth telescoped thereon and having openings in the sidewalls thereof in registry with said bore, retaining means for maintaining the tooth and shank in telescoped relation comprising; a pair of longitudinally bowed resilient pin members extending through said bore and into said openings, the end portions of one of said pin members being in contact with the shank and the end portions of the other of said pin members being in contact with the tooth sidewalls, cooperating means on the pin members and shank to preclude axial movement of the pin members with respect to the shank, said pin members being in contact with each other at their respective midportions and resiliently tensioned thereby toward a straight line position to activate said cooperating means.

References Cited by the Examiner
UNITED STATES PATENTS

| | | | |
|---|---|---|---|
| 2,383,079 | 8/45 | Reed | 85—8.3 X |
| 2,401,976 | 6/46 | Simpson | 85—8.3 |
| 2,653,505 | 9/53 | Pietzsch | 85—8.3 |
| 2,798,403 | 7/57 | Launder | 85—8.3 |
| 2,904,908 | 9/59 | Ratkowski | 37—142 |
| 2,936,538 | 5/60 | Opsahl | 37—142 |

FOREIGN PATENTS

| | | |
|---|---|---|
| 50,115 | 9/39 | France. |
| 213,291 | 2/58 | Australia. |

BENJAMIN HERSH, *Primary Examiner.*

M. M. FRITZ, J. A. MANIAN, *Examiners.*